United States Patent Office 2,701,779
Patented Feb. 8, 1955

2,701,779

ALLOYED WELDING FLUXES

William M. Conn, Kansas City, Mo.

No Drawing. Application October 10, 1949,
Serial No. 120,605

1 Claim. (Cl. 148—24)

The present invention is concerned with a flux for electrically arc welding metal, for instance, armor plate or boiler plate.

The main purpose of my invention is to extend the field of use of mullite-containing fluxes by introducing one or several additives which serve as alloying materials and deoxidizers; some additives may also act in the flux as melting point depressants. They result in greatly improved metallurgical properties of the weld metal and adjacent zones, as for instance strength, and they also lead to improved ductility due to improved annealing.

A further important purpose of the invention is to prevent undesirable results arising from dissolving by the flux materials out of the metal and by introducing other materials into the metal having compensatory effects. Other purposes of my invention will become apparent during the following specification.

The ingredients may be added to the raw materials used for producing the mullite flux of my Patent No. 2,258,675, issued October 14, 1941; or they may be added to natural or synthetic mullite $Al_6Si_2O_{13}$, a crystalline, anhydrous and gas-free mineral. In certain instances, however, the advantages of the invention can be realized by incorporating the ingredients at more than one stage of the process.

The batch is ground to pass a 12-mesh screen, then heated to as low a temperature as possible for the formation of mullite (if not or only partly present in the original batch), but sufficiently high to remove all physically and chemically bound water, as well as gas-forming ingredients. Temperatures may vary from approximately 900° C. to 1100° C. The batch is not fused as a whole as in the prior art, but cooled and ground to the desired particle-size distribution. The comparatively low temperature of processing makes it possible to compound the entire batch at one time before processing it, whereas certain ingredients have to be added to the batch after melting and cooling in a pre-fused flux, as for example calcium fluoride.

In cases where large amounts of alloying ingredients or special alloying ingredients are required in a weld, it may be preferable to introduce part of such ingredients through the flux and part through the welding electrode, as for instance when welding armor plate.

The alloying additives I have found desirable within the percentages given are: manganese 0.2–25% in the form of any compound or alloy. Similarly, chromium 0.2–25% or molybdenum, cobalt, columbium or nickel 0.2–25%. Some of these, for instance, manganese, nickel, cobalt, and chromium, act also as melting point depressants. As deoxidizers, elemental or alloyed silicon, titanium, zirconium, vanadium, aluminum, magnesium, the borides of calcium, manganese or iron, or carbon, all in amounts of 0.2–10% may be included. The total amount of ingredients other than mullite may be as high as 70% of the batch.

It should be noted that careful scientific experiments have established the fact that notwithstanding older ideas, oxides of metals, for example manganese oxide, may have an alloying action in welding even if no conventional deoxidizer is present. Although I have not completely established the theoretical basis for this fact, I am inclined to believe that various degrees of oxidation are obtained in processing and welding, possibly under the influence of a reducing atmosphere, which will cause all or part of the manganese in the flux to ultimately form manganese metal, which metal will be in the molten state and will alloy with the molten weld metal, for instance, steel. Such results were obtained even if the flux consisted only of mullite and metal fluorides, oxides and silicates.

A considerable range of selection is possible among ingredients to be combined in mullite-containing fluxing materials. Table I presents examples of batch formulae for welding so-called grade A boiler plate. The fluxes mentioned, both with and without conventional deoxidizer, gave very satisfactory and much stronger and better annealed welds than obtained under the same operating conditions using prefused flux containing equivalent amounts of manganese.

Table I

|  | Example #1 | Example #2 | Example #3 |
|---|---|---|---|
|  | Percent | Percent | Percent |
| Mullite | 44.5 | 82.5 | 40.5 |
| Clay, raw | 34.5 |  | 25.0 |
| Calcium Fluoride | 7.0 | 6.5 | 6.3 |
| Titanium Dioxide | 3.5 | 3.0 | 3.3 |
| Silicon | 1.0 |  |  |
| Manganese Oxide | 9.5 |  | 10.0 |
| Ferro-Manganese |  | 8.0 |  |
| Sodium Silicate |  |  | 15.0 |

Fluxes containing mullite and clay will after processing consist essentially of mullite, since the clay will form mullite in addition to other ingredients, depending on its analysis. Fluxes disclosed in this invention contain mullite even after processing. Fluxes containing mullite and ingredients herein disclosed will produce welds having the superior qualities above referred to.

If my flux, for example of particle size between 20 and 200 mesh, is used for submerged arc welding, the slag will still contain crystalline mullite, as determined by microscopic and X-ray diffraction tests. This is a great improvement over the prior art because the solid mullite floating on the slag while the weld metal and the remainder of the slag are still in a plastic or semi-plastic condition will form a protective crust or shell, resulting in gradual freezing of the metal and the remainder of the slag.

The stability of mullite in these fluxes is a great improvement over the prior art in which fluxes high in alumina and/or silica have been disclosed. While mullite of the present invention remains unmelted during the arc welding, older fluxes will in the molten state produce metallic silicates of higher silica content than mullite, for example, sodium aluminum silicates, calcium aluminum silicates, etc. Such silicates have lower solidifying points than mullite and will not form protective crusts or shields over the weld, nor will they produce welds with such excellent ductility and strength as the flux of the present invention. Similarly, it is found that when the refractory character of various $Al_2O_3$—$SiO_2$ mixtures is considered, mixtures of the composition $3Al_2O_3.2SiO_2$ (mullite) and those still richer in alumina begin to melt only at 1810° C., whereas, the slightest excess of silica over the $3Al_2O_3.2SiO_2$ ratio suffices to cause an initial melting at 1545° C., the eutectic temperature.

The shield of mullite is established before the material of the weld and the other ingredients of the flux harden. The crust or shell formed over the unhardened material of the weld not only protects it but, also, slows down the cooling thereof while retaining it in position. The heat insulating effect and the slowing down of the cooling is aided by the entrapment of gas by the crust which shows a high porosity upon cooling. The slag, due to its porosity, retains heat even after solidification of the weld metal and adjacent regions. It thus conveys heat to the solid, semi-plastic metal and tends to improve its annealing. Whatever additive materials are present can thus function for a longer period of time and their effects are thus enhanced by the solid crust or shell formed.

It will be obvious that the product of my invention may be used as a coating for rods, wire coils, or as a separate powdered material.

The typical formulae herein given are by way of example only, and it will be understood that variations therein will occur to those skilled in the art. The invention, therefore, should not be regarded as restricted except as required by the spirit of the following claim.

Having thus described my invention, what I claim as new and desire to secure by Letters Patent is:

An electric arc welding flux consisting of approximately 82.5 percent mullite; 3 percent titanium dioxide; 8 percent ferro-manganese; and 6.5 percent calcium fluoride.

References Cited in the file of this patent

UNITED STATES PATENTS

| Number | Name | Date |
|---|---|---|
| 2,141,938 | Shepherd | Dec. 27, 1938 |
| 2,150,925 | Johnston | Mar. 21, 1939 |
| 2,194,200 | Cohn | Mar. 19, 1940 |
| 2,258,675 | Cohn | Oct. 14, 1941 |
| 2,282,175 | Emerson | May 5, 1942 |
| 2,308,194 | Miller | Jan. 12, 1943 |
| 2,360,716 | Peters | Oct. 17, 1944 |
| 2,435,852 | Stringham | Feb. 10, 1948 |